Dec. 15, 1959 R. L. VIERLING 2,917,303
SNUBBED SPRING SUSPENSIONS FOR VEHICLE WHEELS
Filed Dec. 22, 1955
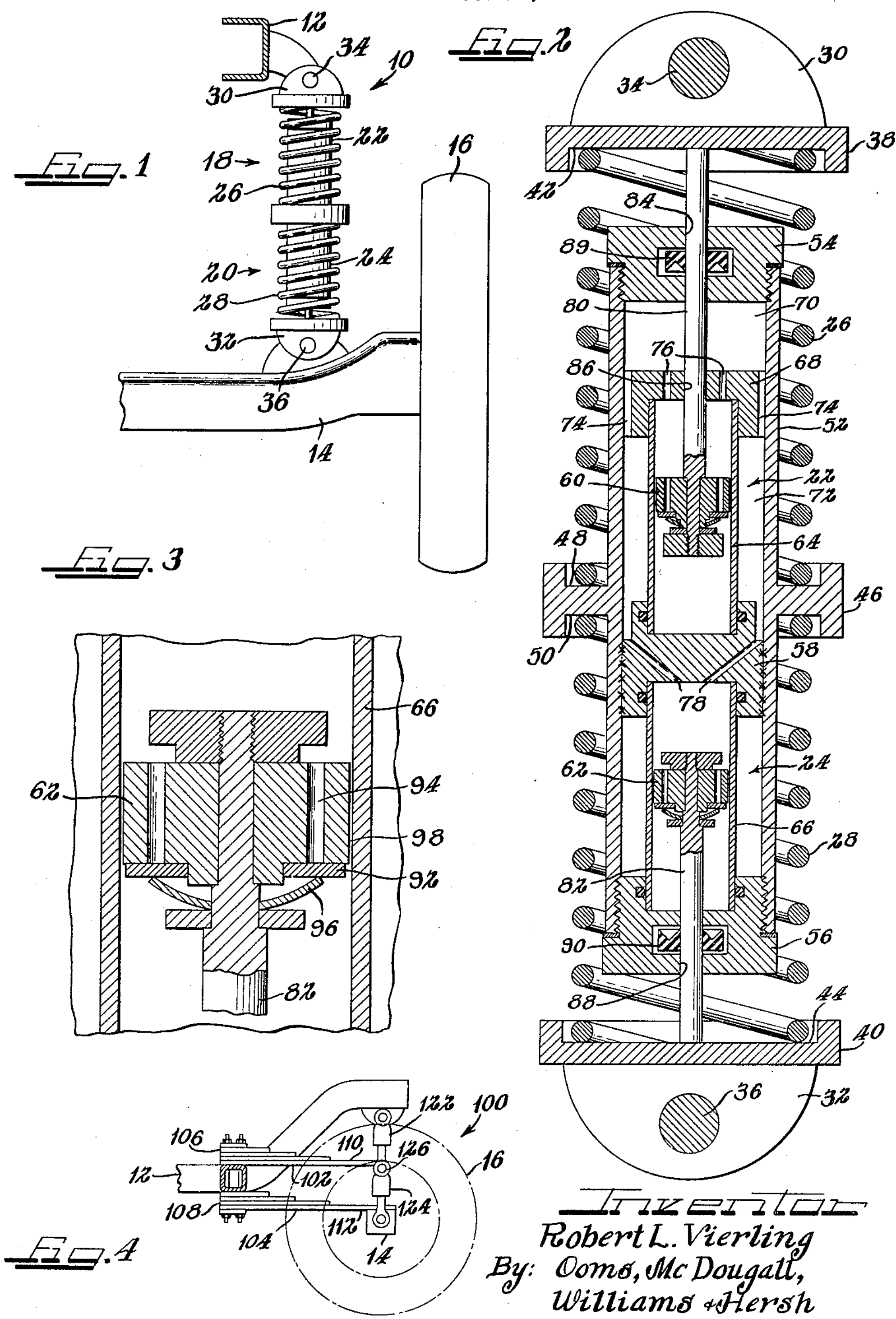
Inventor
Robert L. Vierling
By: Ooms, McDougall, Williams & Hersh
Attys.

2,917,303
Patented Dec. 15, 1959

2,917,303

SNUBBED SPRING SUSPENSIONS FOR VEHICLE WHEELS

Robert L. Vierling, Chicago, Ill.

Application December 22, 1955, Serial No. 554,892

3 Claims. (Cl. 267—8)

This invention relates to spring suspensions adapted to be connected between frames and wheel supports on wheeled vehicles.

One principal object of the present invention is to provide new and improved spring suspensions of the type provided with snubbers or shock absorbers for controlling rebounding and oscillations of the springs.

A further object is to provide a new and improved spring suspension having snubbers which control spring oscillation but afford little resistance to relative movement between the wheel support and the frame of the vehicle.

Another object is to provide a new and improved spring suspension having two sub-units connected in tandem and including respective springs and snubbers, one snubber being arranged to resist flexure of the corresponding spring in one direction while the other snubber is arranged to resist flexure of the associated spring in the opposite direction.

It is a further object of the present invention to provide a new and improved spring suspension whereby a vehicle wheel will follow variations in the level of the supporting surface, without appreciably disturbing the position of the frame, yet will not rebound or oscillate to any appreciable extent.

Thus, it is an object of the present invention to provide a novel spring suspension which will impart improved riding qualities to a vehicle.

Further objects and advantages of the invention will appear from the following description, taken with the accompanying drawings, in which:

Fig. 1 is a somewhat diagrammatic front elevational view of a spring suspension constituting an illustrative embodiment of the present invention.

Fig. 2 is an enlarged longitudinal sectional view of the spring suspension of Fig. 1.

Fig. 3 is a large scale, fragmentary, longitudinal sectional view showing details of one of the snubbers employed in the spring suspension of Fig. 1.

Fig. 4 is a somewhat diagrammatic side elevational view of a modified spring suspension constructed in accordance with the present invention.

If the drawings are considered in greater detail, it will be seen that Figs. 1–3 illustrate a spring suspension 10 applied to a wheeled vehicle, such as an automobile, for example, shown in fragmentary fashion. Thus, the spring suspension 10 is adapted to be connected between a vehicle frame 12 and a wheel support 14 which is movable, generally in a vertical direction, with respect to the frame 12. A wheel 16 is rotatably mounted on the wheel support 14.

It will be seen that the suspension 10 comprises a pair of sub-units 18 and 20 including respective snubbers 22 and 24 connected in tandem between the vehicle frame 12 and the wheel support 14. Springs 26 and 28 are operatively associated with the respective snubbers 22 and 24.

The arrangement of the springs 26 and 28 and the snubbers 22 and 24 may be varied to a considerable extent. However, in the illustrative embodiment of Figs. 1–3, the springs 26 and 28 are connected directly across the associated snubbers 22 and 24. The springs 26 and 28 may be of any known or suitable type, such as coil springs, leaf springs, or torsional springs, for example. In the embodiment of Figs. 1–3, the springs 26 and 28 assume the form of compression coil springs. The snubbers 22 and 24 are coaxially disposed within the coil springs 26 and 28.

It will be seen that the illustrated spring suspension 10 comprises opposite end members 30 and 32 adapted to be connected to the frame 12 and the wheel support 14 by means of pivots 34 and 36. Shallow cup-shaped portions 38 and 40 are formed on the end members 30 and 32 to provide recesses or seats 42 and 44 for the ends of the springs 26 and 28. More specifically, the upper end of the spring 26 is received in the seat 42 in the upper member 30, while the lower end of the spring 28 is received in the seat 44 in the lower member 32.

To receive the other ends of the springs 26 and 28, a movable member 46 is disposed in intermediate relation to the end members 30 and 32. It will be seen that the intermediate member 46 is provided with oppositely facing spring seats 48 and 50. The lower end of the spring 26 is received in the seat 48, while the upper end of the spring 28 is positioned in the seat 50.

It will be seen that the upper snubber 22 is connected between the upper member 30 and the intermediate member 46, while the lower snubber 24 is connected between the lower member 32 and the intermediate member 46. Thus, the intermediate member 46 serves to connect the snubbers in tandem between the frame 12 and the wheel support 14.

In itself, each of the snubbers 22 and 24 may be of any known or suitable type adapted to resist movement in one direction while affording little or less resistance to movement in the opposite direction. In accordance with the invention, however, the snubbers are arranged oppositely so that one resists movement in one direction while the other resists movement in the opposite direction. Thus, one snubber resists compression of its associated spring while the other snubber resists extension of the corresponding spring. In this way, the snubbers resist oscillation of both springs while affording little resistance to relative movement between the wheel support 14 and the frame 12.

The detailed arrangement of the snubbers 22 and 24 may be varied to a considerable extent. In this instance, both snubbers 22 and 24 are mounted within a cylindrical casing 52 formed integrally with the intermediate member 46. The casing 52 is closed on its opposite ends by upper and lower end caps 54 and 56. A plug 58 is rigidly mounted within the casing 52 at an intermediate point.

It will be seen that the snubbers 22 and 24 comprise pistons 60 and 62 which are movable in cylinders 64 and 66. The cylinder 64 of the upper snubber is mounted between the plug 58 and another plug or disk 68 disposed between the end cap 54 and the plug 58. As illustrated, the lower cylinder 66 is mounted between the plug 58 and the lower end cap 56.

In this instance, the portion of the casing 52 above the plug 58 is adapted to act as a reservoir for hydraulic fluid. This portion of the casing 52 is divided into two chambers 70 and 72 by the disk 68, but the chambers are connected together by one or more passages 74 extending through the disk. In order that hydraulic fluid may be supplied to the upper cylinder 64 from the reservoir chamber 70, one or more passages 76 are formed in the disk 68 between the cylinder 64 and the chamber 70. Likewise, one or more passages 78 are formed in the plug 58 between the reservoir chamber 72 and the lower cylinder 66. It will be seen that the passages 76 and 78 communicate with the upper ends of the cylinders 64 and 66.

It will be seen that a piston rod 80 extends between the piston 60 of the upper snubber 22 and the upper end member 30. Likewise, a piston rod 82 extends between the lower piston 62 and the lower end member 32. The upper piston rod 80 extends through apertures 84 and 86 in the end cap 54 and the disk 68. An aperture 88 is provided in the end cap 56 to pass the lower piston rod 82. Sealing rings 89 and 90 are disposed around the piston rods 80 and 82 to prevent leakage of hydraulic fluid through the apertures 84 and 88.

The pistons 60 and 62 are movable upwardly, with respect to the cylinders 64 and 66, with relatively little resistance. However, considerably resistance is afforded to downward movement of the pistons 60 and 62 with respect to the cylinders 64 and 66. In order to provide for passage of the hydraulic fluid through the pistons 60 and 62 during upward movement thereof, each piston is provided with a valve 92 adapted to open and close one or more passages 94 extending through the piston. In this instance, each of the valves 22 assumes the form of a disk movable into sealing engagement with the lower end of the corresponding piston to close off the passages 94. A light spring 96 is provided to bias the valve disk 92 upwardly against the piston. Thus, the valve 92 permits downward movement of hydraulic fluid relative to the piston, while preventing upward movement of the fluid through the passages 94. During upward movement of the pistons 60 and 62, the valves 92 open and permit the hydraulic fluid to pass downwardly and thereby maintain the portions of the cylinders below the pistons full of hydraulic fluid. During downward movement of the pistons 60 and 62, the valves 92 close so that the hydraulic fluid below the pistons is trapped in the cylinders 64 and 66.

In order that the pistons 60 and 62 may be movable downwardly in the cylinders 64 and 66, against the resistance afforded by the trapped hydraulic fluid, provision is made for the limited escape of the hydraulic fluid from the portions of the cylinders below the pistons. Various means might be provided to accomplish this end. However, in this case, the fit of the pistons 60 and 62 is made sufficiently loose to provide limited clearance 98 between the pistons and the cylinders 64 and 66. This clearance space 98 permits limited passage of the hydraulic fluid around the pistons 60 and 62.

It will be apparent that compression of the upper spring 26 will cause downward movement of the piston 60 relative to the cylinder 64. Such downward movement will be resisted by the trapped hydraulic fluid in the cylinder 64. Thus, the upper snubber 22 resists compression of the spring 26. On the other hand, little resistance is afforded to extension of the spring 26.

Compression of the lower spring 28 causes upward movement of the piston 62 in the cylinder 66. Little resistance is afforded to such movement. However, the lower snubber 24 is effective to resist extension of the spring 28 by resisting downward movement of the piston 62 relative to the snubber 66. It will be understood that both compression springs 26 and 28 are pre-loaded by the portion of the vehicle weight carried by the spring suspension 10.

In operation, the wheel support 14 is frequently moved upwardly and downwardly, with respect to the vehicle frame 12, because of irregularities in the road or other surface which supports the wheel 16. Upward movement of the wheel support 14 causes immediate compression of the lower spring 28, because such compression is not appreciably resisted by the snubber 24. However, the upper snubber 22 resists immediate compression of the upper spring 26. Upon subsequent downward movement of the wheel support 14, the upper spring 26 is immediately extended, because the upper snubber 22 does not appreciably resist such extension. However, the lower snubber 24 resists immediate extension of the lower spring 28. It will be apparent that the intermediate member 46 will shift in position as irregularities are encountered in the road. However, the tendency will be for the intermediate member 46 to return to its neutral position in which the upper and lower springs are in equilibrium.

It will be apparent that neither the upper nor the lower spring can rebound or oscillate appreciably because flexure of each spring is strongly resisted in one direction by the associated snubber. Thus, the upper snubber resists compression of the upper spring, while the lower snubber resists extension of the lower spring. However, the snubbers afford little resistance to upward and downward movement of the wheel support relative to the vehicle frame. Accordingly, the wheel support is free to follow irregularities in the road, without appreciably disturbing the position of the vehicle frame. Nevertheless, oscillation and rebounding of both springs is effectively controlled. The result is a material improvement in the riding qualities of the vehicle.

It has already been noted that the springs of the spring suspension may be of any known or suitable type. Thus, Fig. 4 illustrates a modified spring suspension 100 which utilizes two leaf springs 102 and 104. It will be seen that the springs 102 and 104 have end portions 106 and 108 which are rigidly mounted on the vehicle frame 12. Freely movable portions 110 and 112 are provided at the opposite ends of the springs 102 and 104.

As in the first embodiment of Figs. 1–3, snubbers 122 and 124 are connected in tandem between the wheel support 14 and the vehicle frame 12. In all material respects, the snubbers 122 and 124 may be same in construction and operation as the snubbers 22 and 24.

It will be seen that the upper snubber 122 is connected between the frame 12 and an intermediate pivot member 126. The lower snubber 124 is connected between the wheel support 14 and the intermediate member 126.

In this instance, the free end portion 112 of the lower leaf spring 104 is connected directly to the wheel support 14. On the other hand, the free end portion 110 of the upper leaf spring 102 is connected to the intermediate member 126. Thus, the lower snubber 124 is effectively connected between the free end portions 110 and 112 of the upper and lower leaf springs 106 and 108.

As already indicated the snubbers or shock absorbers 122 and 124 are essentially the same as the snubbers 22 and 24. Thus, the snubber 124 resists downward movement of the wheel 16 relative to the free end portion 110 or the spring 102, while affording little resistance to upward movement of the wheel. Accordingly, the spring 104 carries all of the static load supported by the wheel 16.

The snubber 122 resists upward movement of the end portion 110 on the spring 102, relative to the frame 12, while affording little resistance to downward movement of the end portion 110.

Any upward movement of the wheel 16, with respect to the frame 12, is not resisted to any substantial extent by the snubber 124. Such upward movement increases the flexure of the spring 104. When the spring 104 returns the wheel downwardly the snubber 124 tends to flex the spring 102 downwardly, inasmuch as the snubber resists immediate extension. The snubber 122 does not afford any substantial resistance to such downward flexing of the spring 102. However, the snubber 122 is effective to resist the subsequent upward return of the spring 102. It will be apparent that the snubbers 122 and 124 are effective to control the rebound of both springs 102 and 104 so as to prevent any substantial oscillations in the springs. At the same time, the snubbers leave the wheel relatively free to follow variations in the road.

Various modifications, alternative constructions and equivalents may be employed without departing from the true spirit and scope of the invention as exemplified in the foregoing description and defined in the following claims.

I claim:

1. In a spring suspension for a vehicle having a frame, a wheel and a movable support for said wheel, the combination comprising first and second members adapted to be connected to said frame and said support, a third member disposed in intermediate relation to said first and second members, a first spring connected between said first and third members, a second spring connected between said second and third members, said springs thereby being arranged in tandem to transmit loads from said frame to said support, a first hydraulic snubber connected across said first spring between said first and third members, a second hydraulic snubber connected across said second spring between said second and third members, said first snubber having means yieldably resisting movement of said third member relative to said first member in one direction while permitting relatively free movement in the opposite direction, said second snubber having means resisting movement of said second member relative to said third member in said opposite direction while permitting relatively free movement in said one direction, said snubbers thereby acting oppositely to snub both of said springs while permitting relatively free movement of said support with respect to said frame and in either direction.

2. In a wheel suspension device for a vehicle having a frame and a movable wheel support, the combination comprising first and second members adapted to be connected to said frame and said wheel support, first and second suspension units connected in tandem between said members, each of said suspension units comprising a spring and a snubber connected across said spring, each of said snubbers having means affording relatively great resistance to movement of said spring in one direction while affording relatively small resistance to movement in the other direction, said snubbers being oppositely arranged so that one snubber affords relatively great resistance to movement in one direction while the other snubber affords relatively great resistance to movement in the opposite direction, whereby both of said springs are snubbed yet relatively small resistance is afforded to relative movement between said frame and said wheel support in both directions.

3. In a wheel suspension device for a vehicle having a frame and a movable wheel support, the combination comprising first and second members adapted to be connected to said frame and said wheel support, first and second suspension units connected in tandem between said members, each of said suspension units comprising a resilient unit and a snubber connected across said resilient unit, each of said snubbers having means affording relatively great resistance to movement of said resilient unit in one direction while affording relatively small resistance to movement in the other direction, said snubbers being oppositely arranged so that one snubber affords relatively great resistance to movement in one direction while the other snubber affords relatively great resistance to movement in the opposite direction, whereby both of said resilient units are snubbed yet relatively small resistance is afforded to relative movement between said frame and said wheel support in both directions.

References Cited in the file of this patent

UNITED STATES PATENTS 2,578,138 Janeway et al. ---------- Dec. 11, 1951

FOREIGN PATENTS 952,367 France ---------------- May 2, 1949